(12) United States Patent
Dudash et al.

(10) Patent No.: US 6,223,436 B1
(45) Date of Patent: *May 1, 2001

(54) MOTOR VEHICLE SEAT

(75) Inventors: Eugene S. Dudash, Wixom; Mark Stanisz, Waterford; Eric A. Smitterberg, Berkley; L. Keith Hensley, Farmington Hills; Sanford E. Cook, Belleville; Kevin J. Fudale, Dearborn Heights, all of MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,875

(22) Filed: Jan. 28, 1998

Related U.S. Application Data

(62) Division of application No. 08/660,523, filed on Jun. 7, 1996, now Pat. No. 5,769,499.

(51) Int. Cl.[7] .................................................. B21D 53/88
(52) U.S. Cl. .................................. 29/897.2; 297/452.18; 148/690
(58) Field of Search ................................. 29/897, 897.35, 29/897.2, 525.05; 72/411, 256; 297/452.18; 148/690

(56) References Cited

U.S. PATENT DOCUMENTS

| 3,345,730 | | 10/1967 | Laverty . | |
|---|---|---|---|---|
| 4,100,668 | * | 7/1978 | Ruff et al. | 29/523 |
| 4,519,650 | * | 5/1985 | Terada et al. | 297/452 |
| 4,544,204 | * | 10/1985 | Schmale | 297/452 |
| 4,631,797 | * | 12/1986 | Hill | 29/509 |
| 4,844,545 | | 7/1989 | Ishii . | |
| 4,923,250 | | 5/1990 | Hattori . | |
| 5,401,072 | | 3/1995 | Farrand . | |
| 5,412,860 | * | 5/1995 | Miyauchi et al. | 29/557 |
| 5,499,863 | * | 3/1996 | Nakane et al. | 297/452.2 |
| 5,636,901 | | 6/1997 | Grilliot et al. . | |
| 5,671,521 | * | 9/1997 | Briles | 29/509 |
| 5,769,499 | * | 6/1998 | Dudash et al. | 297/452.18 |
| 5,810,446 | * | 9/1998 | Tadokoro | 297/452.18 |

FOREIGN PATENT DOCUMENTS 233822  8/1987  (EP) .

* cited by examiner

Primary Examiner—P. W. Echols
Assistant Examiner—Jermie E. Cozart
(74) Attorney, Agent, or Firm—Brooks & Kushman P.C.

(57) ABSTRACT

The present invention provides an apparatus for supporting a seat back in a vehicle comprising an aluminum I-beam formed in a generally U-shaped configuration, and having opposing ends supported with respect to the vehicle for forming a seat back frame. Also provided is a method of manufacturing a vehicle seat back frame, comprising: a) extruding an aluminum I-beam; b) cutting the I-beam to a desired length; c) age-hardening the I-beam; and d) bending the I-beam into a substantially U-shaped configuration to form a vehicle seat back frame.

21 Claims, 5 Drawing Sheets

MOTOR VEHICLE SEAT

This is a divisional of application Ser. No. 08/660,523 filed on Jun. 7, 1996, now U.S. Pat. No. 5,769,499.

TECHNICAL FIELD

The present invention relates generally to motor vehicle seats, and more particularly to a seat back frame.

BACKGROUND OF THE INVENTION

Typically, vehicle seat assemblies include a recliner mechanism which supports a substantially U-shaped seat back frame with a cross-member extending across the back frame, and head rest guide tubes extending through the back frame for supporting a head rest assembly. Normally, an aluminum back frame comprises a hollow aluminum tube bent into a U-shaped configuration. The tube is usually bent in an unheat-treated condition, and then heat-treated after bending, or alternatively, the tube is annealed locally for bending. The heat-treating operation adds substantial manufacturing, handling, and shipping costs to the assembly.

The prior art bent tubes are deformed in the upper bending corners and have thin walls in the attachment areas, which results in a high shear stress. The thin attachment areas require a splint or insert to be inserted therein to reduce the shear stress. Furthermore, for attachment of the head rest guide tubes, apertures must be bored through both sides of the back frame tube, which may be awkward and may unnecessarily increase manufacturing costs.

It is desirable to provide a seat assembly in which localized heat treatment is not required prior to bending the seat back frame, heat treatment after frame completion is not rigid, and in which structural integrity is enhanced and manufacturing costs are reduced.

DISCLOSURE OF THE INVENTION

The present invention overcomes the above-referenced shortcomings of prior art seat assemblies by providing a seat back frame in the form of an extruded solid aluminum I-beam which does not require heat treatment for bending, localized heat treatment prior to bending, or post-bending heat treatment.

More specifically, the present invention provides an apparatus for supporting a seat back in a vehicle, comprising an aluminum I-beam formed in a generally U-shaped configuration, and having opposing ends supported with respect to the vehicle. The I-beam forms a seat back frame for supporting a seat back.

The present invention further provides a method of manufacturing a vehicle seat back frame, comprising the following steps: a) extruding an aluminum I-beam comprising a center support positioned between first and second flanges extending the length of the I-beam; b) cutting the I-beam to a desired length; c) age-hardening the I-beam; and d) bending the I-beam into a substantially U-shaped configuration, such that the center support and first and second flanges cooperate to form an inwardly-facing channel and an outwardly-facing channel.

In a preferred embodiment, the assembly includes a cross-member extending across the U-shaped I-beam, with the cross-member attached to the I-beam at opposing ends by a pair of swaged nuts.

The present invention also provides a method for attaching a head rest guide tube to a seat back frame having a substantially flat section with an aperture formed therethrough. The method comprises inserting the guide tube into the aperture and swaging (also termed "swedging") the guide tube on both sides of the flat section whereby to secure the guide tube within the aperture.

Accordingly, an object of the present invention is to provide an aluminum seat back frame which does not require specialized heat treatment for bending.

Another object of the present invention is to provide a vehicle seat back frame with improved structural integrity.

Yet another object of the present invention is to provide a vehicle seat back frame with reduced manufacturing costs.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
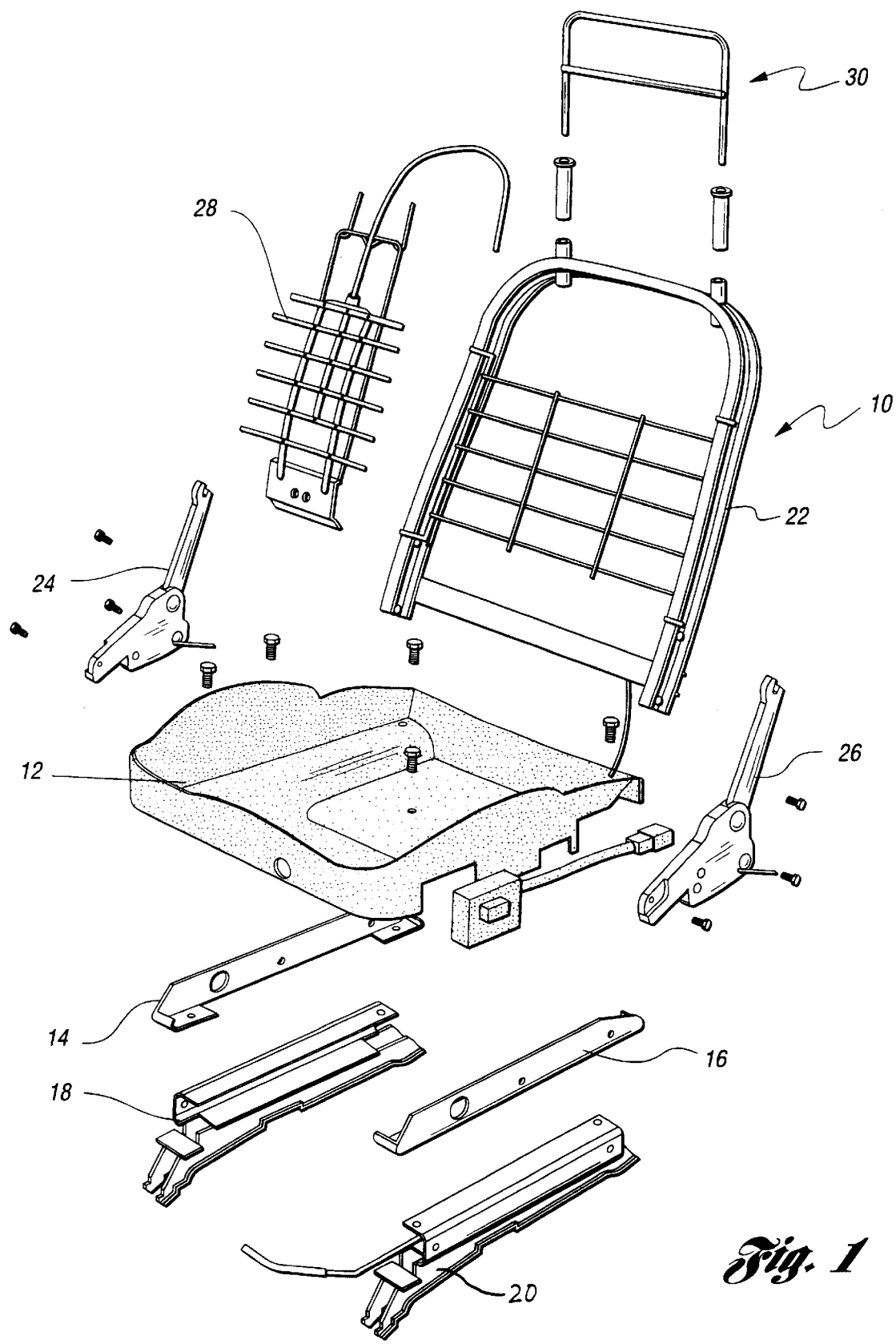
FIG. 1 shows an exploded perspective view of a vehicle seat assembly in accordance with the present invention.

FIG. 1 shows an exploded perspective view of a vehicle seat assembly 10 in accordance with the present invention. The assembly 10 includes a cushion frame 12 supported by a pair of support brackets 14,16. The support brackets 14,16 are mounted by the seat adjusters 18,20, which mount the assembly in the vehicle. The seat back frame 22 is pivotally mounted with respect to the cushion frame 12 by means of the recliner mechanism 24,26. The seat back frame 22 includes a lumbar support structure 28 mounted thereto, as well as a head rest support assembly 30 for supporting a head rest cushion with respect to the seat back frame 22.

Figure 2:
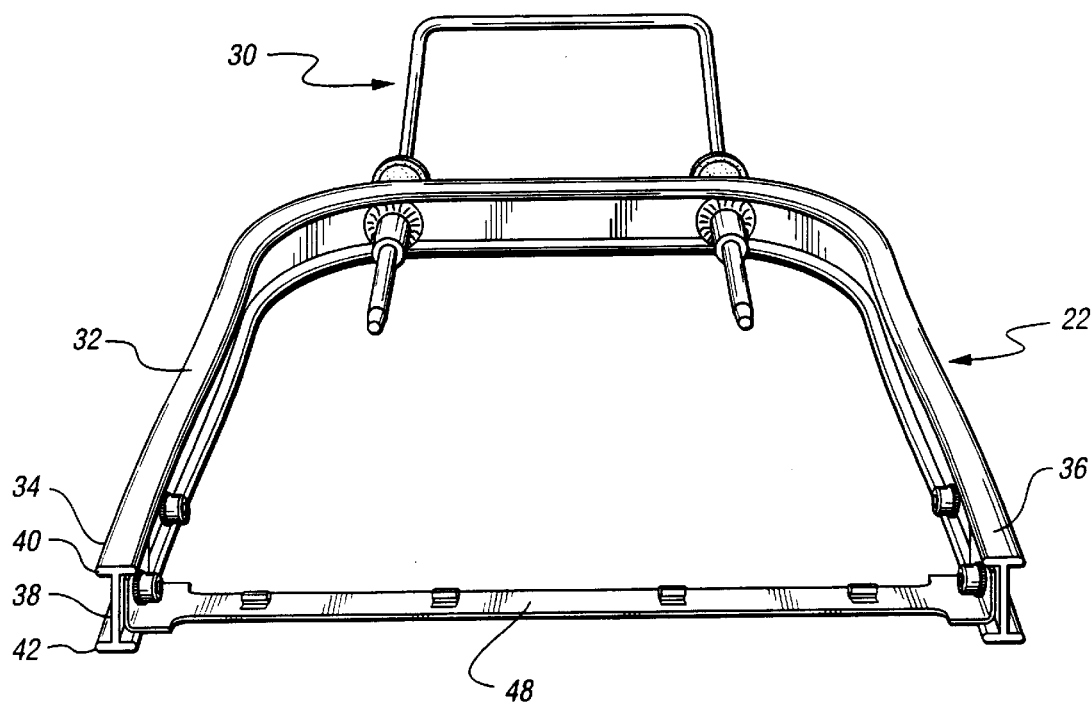
FIG. 2 shows a perspective end view of a seat back frame assembly in accordance with the present invention.
Figure 3:
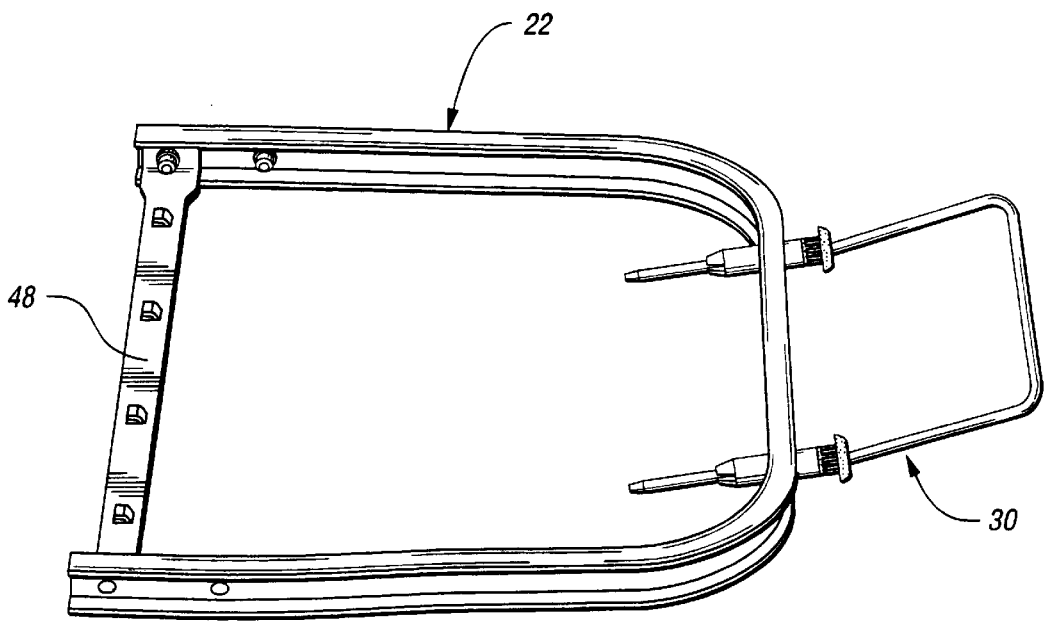
FIG. 3 shows a side perspective view of the seat back frame assembly shown in FIG. 2.
Figure 5:
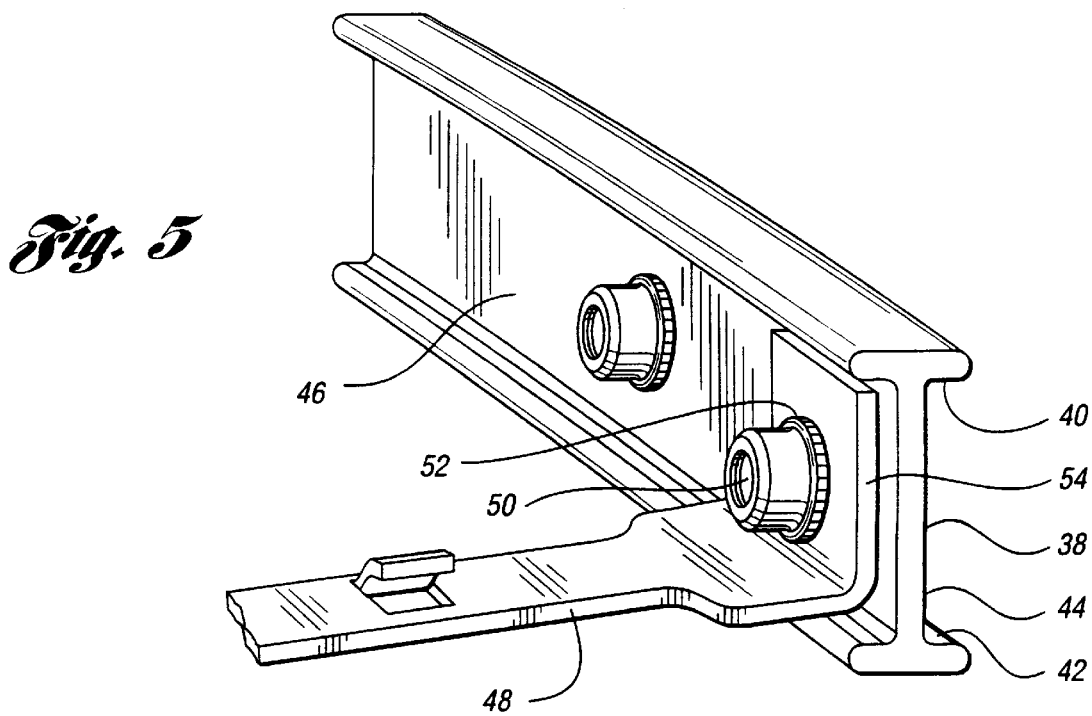
FIG. 5 shows a perspective view of a seat back frame with a swage-bolted cross-member in accordance with the present invention.

The seat back frame 22 is more clearly shown in FIGS. 2 and 3. The seat back frame 22 comprises an aluminum I-beam 32 bent in a substantially U-shaped configuration. The I-beam 32 includes opposing ends 34,36 which are pivotally supported with respect to the vehicle by the recliner mechanisms 24,26. The I-beam 32 includes a center support 38 positioned between first and second flanges 40,42 extending the length of the I-beam 32. The center support 38 and first and second flanges 40,42 are more clearly shown in FIG. 5. In this configuration, the I-beam 32 forms an outwardly-facing channel 44, and an inwardly-facing channel 46.

Figure 9:
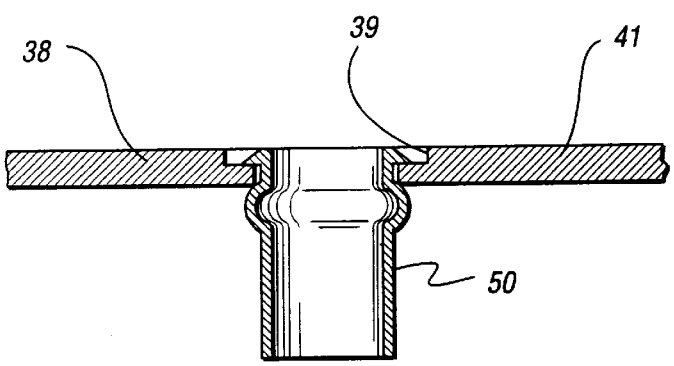
FIG. 9 shows a vertical cross-sectional view of a lower attachment bolt secured to the back frame.

Returning to FIG. 2, the seat back frame 22 includes a cross-member 48 extending between the opposing ends 34,36 of the I-beam 32. Turning back to FIG. 5, the cross-member 48 is secured to the center support portion 38 of the I-beam 32 by the nuts 50. The nuts 50 include a flange 52 which is swaged against the dowel portion 54 of the cross-member 48 for securing the cross-member 48 with respect to the I-beam 32. In this manner, a welding operation is eliminated from the seat back frame assembly process. As shown in FIG. 9, the center support portion 38 includes a countersink 39 on the outer surface 41 so that the nut 50 may be secured flush with the outer surface 41.

Figure 4:
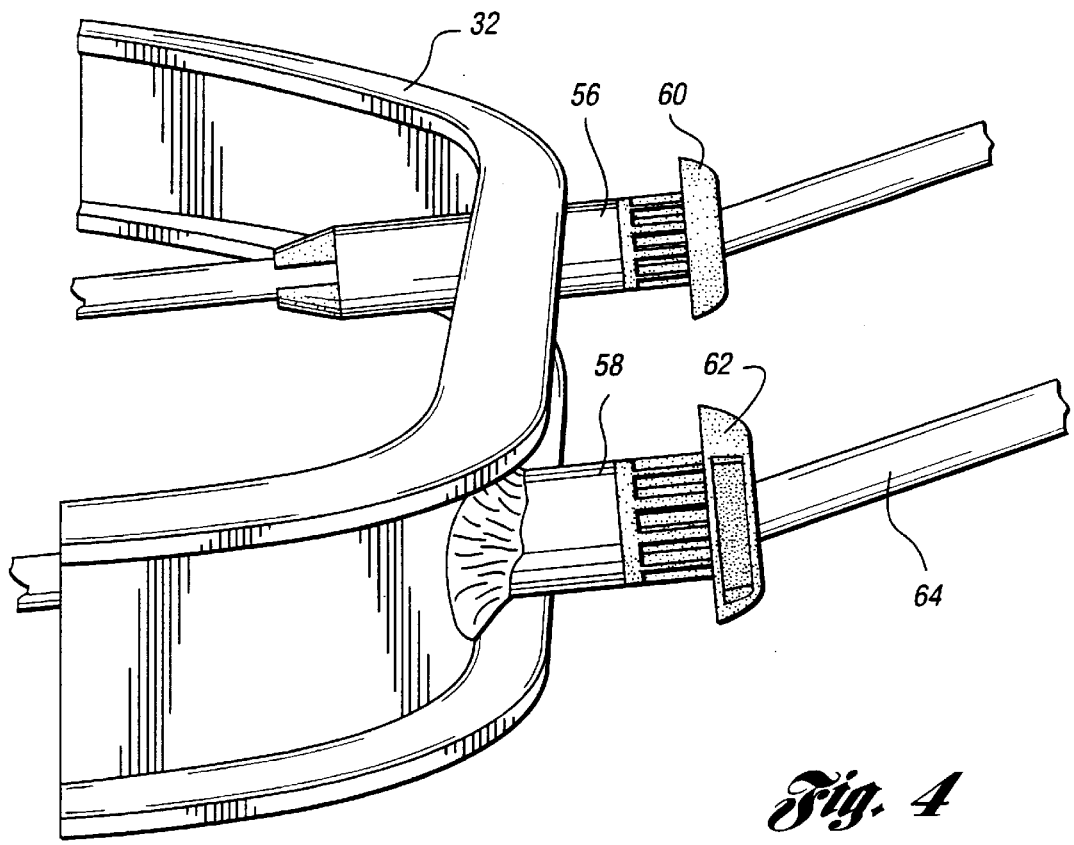
FIG. 4 shows a partial perspective view of a seat back frame and head rest assembly in accordance with the present invention.

Referring to FIGS. 3 and 4, the head rest support assembly 30 is more clearly shown. The head rest support assembly 30 includes a pair of head rest guide tubes 56,58 which are welded into position within a pair of apertures formed in the center support section 38 of the I-beam 32. Alternatively, the head rest guide tubes 56,58 could be swaged into position for support with respect to the I-beam 32 (as discussed below with reference to FIGS. 7 and 8). Plastic head rest adjustment mechanisms 60,62 are supported within the guide tubes 56,58. A head rest support bar 64 is adjustably supported within the plastic adjustment mechanisms 60,62 for vertical adjustment of the head rest.

With this I-beam configuration, a substantial portion of the seat back frame 22 mass is away from the center of mass, which gives better moment of inertia characteristics, thereby reducing bending stress. A bending stress formula is illustrated below:

$$\sigma = \frac{My}{I}$$

where σ is the bending stress, M is the bending moment, y is the distance from the center of mass to the point of maximum stress, and I is the moment of inertia. Accordingly, as the moment of inertia (I) increases, bending stress is reduced. Therefore, structural integrity of the seat back frame is improved in comparison to the prior art tubular back frames.

Figure 6:
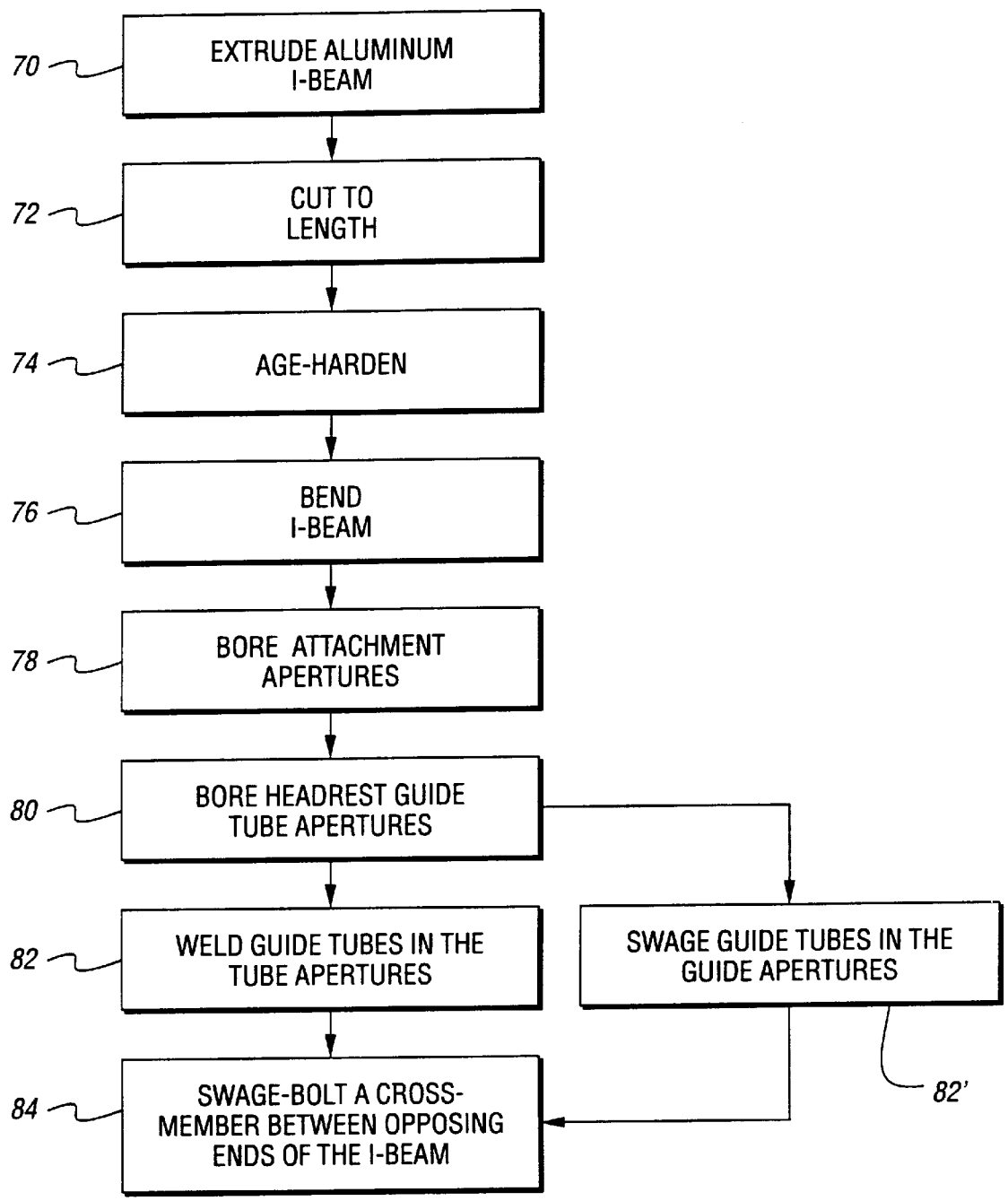
FIG. 6 schematically illustrates method steps for manufacturing a vehicle seat back frame in accordance with the present invention.

The present invention also provides a method of manufacturing a seat back frame, as illustrated in FIG. 6. The method includes extruding an aluminum I-beam (step 70); cutting the I-beam to a desired length (step 72); age-hardening the I-beam (step 74); roll-bending the I-beam in a bend fixture (step 76); boring attachment apertures in the I-beam (step 78); and boring head rest guide tube apertures in the I-beam (step 80). The method further comprises welding guide tubes in the guide tube apertures (step 82), or swaging guide tubes in the guide tube apertures (step 82'), and swage-bolting a cross-member between opposing ends of the I-beam step 84). In this manner, the aluminum I-beam may be purchased in a T6 (fully age-hardened) condition, rather than purchasing in a lower T4 condition, which would require post-bending of the I-beam and then shipping the I-beam back to an appropriate facility for age-hardening to the T-6 condition. Elimination of the step of locally annealing the back frame for bending, or bending the back frame in an unheat-treated condition, and then heat-treating after the bending operation, will significantly reduce manufacturing costs.

Figure 7:
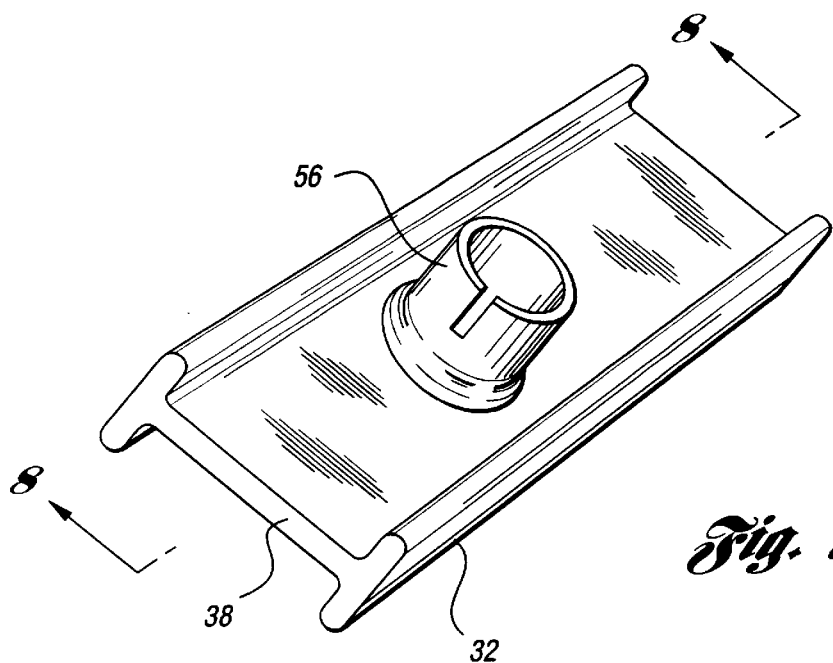
FIG. 7 shows a cutaway perspective view of a seat back frame with a head rest guide tube secured thereto.
Figure 8:
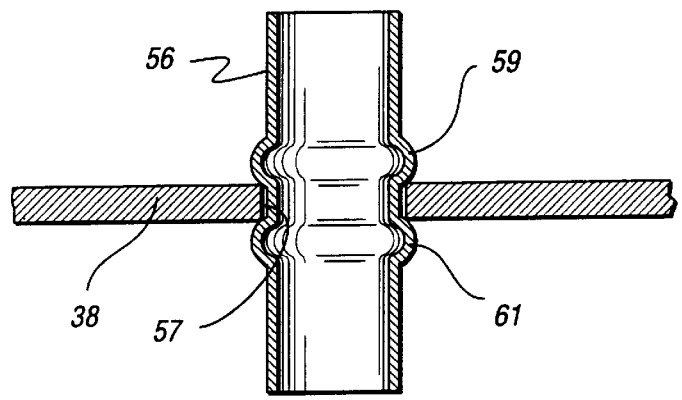
FIG. 8 shows a cross-sectional view of the seat back frame and head rest guide tube shown in FIG. 7.

FIGS. 7 and 8 illustrate a double-swaging attachment of the guide tube 56 to the flat portion (center support) 38 of the I-beam 32. The guide tube 56 is inserted into an aperture 57 formed in the substantially flat center support 38, and is swaged on both sides of the flat section 38 whereby to secure the guide tube 56 within the aperture 57. The swaged portions 59,61 abut the flat center support 38 for securing the guide tube 56.

Preferably, the guide tube 56 has one swaged portion 59 pre-formed, then it is inserted into the aperture 57, and the second swaged portion 61 is formed after insertion. This configuration eliminates welding of the guide tubes, which would require aluminum guide tubes to cooperate with the aluminum back frame. By swaging rather than welding, a steel or other available headrest guide tube could be used.

While the best modes for carrying out the invention have been described in detail, those familiar with the art to which this invention relates will recognize various alternative designs and embodiments for practicing the invention within the scope of the appended claims.

What is claimed is:

1. A method of manufacturing a vehicle seat back frame, comprising:
    a) extruding an aluminum I-beam comprising a center support positioned between first and second flanges extending the length of the I-beam;
    b) cutting the I-beam to a desired length;
    c) fully age-hardening the I-beam; and
    d) bending the I-beam after such full age hardening into a substantially U-shaped configuration, without any post-bending heat treatment, such that said center support and first and second flanges cooperate to form an inwardly-facing channel and an outwardly-facing channel.

2. The method of claim 1, further comprising boring first and second apertures through the I-beam and welding first and second guide tubes in the first and second apertures, respectively.

3. The method of claim 2, further comprising extending a cross-member between opposing ends of the I-beam and swaging bolts for attachment of the cross-member to the I-beam.

4. The method of claim 1, further comprising boring first and second apertures though the I-beam and swaging first and second guide tubes into the first and second apertures, respectively.

5. The method of claim 1, further comprising:
    forming first and second attachment holes at opposing ends of the I-beam;
    extending a cross-member between the opposing ends; and
    swaging bolts within the attachment holes for securing the cross-member to the I-beam.

6. The method of claim 1 wherein extruding an aluminum I-beam comprises extruding a solid aluminum I-beam.

7. A method of manufacturing a vehicle seat back frame, comprising:
    a) extruding a solid aluminum I-beam;
    b) fully age-hardening the I-beam; and
    c) bending the I-beam after such full age-hardening into a substantially U-shaped configuration without any post-bending heat treatment.

8. The method of claim 7 further comprising cutting the I-beam to a desired length.

9. The method of claim 8 wherein cutting the I-beam is performed prior to fully age-hardening the I-beam.

10. The method of claim 7 wherein extruding an aluminum I-beam comprises extruding the I-beam such that the I-beam has a center support positioned between first and second flanges extending the length of the I-beam.

11. The method of claim 10 wherein bending the I-beam comprises bending the I-beam such that the center support and first and second flanges cooperate to form an inwardly-facing channel and an outwardly-facing channel.

12. The method of claim 7 further comprising boring first and second apertures through the I-beam and welding first and second guide tubes in the first and second apertures, respectively.

13. The method of claim 12 further comprising extending a cross-member between opposing ends of the I-beam and swaging bolts for attachment of the cross-member to the I-beam.

14. The method of claim 7 further comprising boring first and second apertures through the I-beam and swaging first and second guide tubes into the first and second apertures, respectively.

15. The method of claim 7 further comprising:
   forming first and second attachment holes at opposing ends of the I-beam;
   extending a cross-member between the opposing ends; and
   swaging bolts within the attachment holes for securing the cross-member to the I-beam.

16. A method of manufacturing a vehicle seat back frame, the method comprising bending a fully age-hardened, solid aluminum I-beam into a substantially U-shaped configuration without any post-bending heat treatment.

17. The method of claim 16 wherein the I-beam has a center support positioned between first and second parallel flanges extending the length of the I-beam, and the bending step comprises bending the I-beam such that the center support and first and second flanges cooperate to form an inwardly-facing channel and an outwardly-facing channel.

18. The method of claim 16 further comprising boring first and second apertures through the I-beam and welding first and second guide tubes in the first and second apertures, respectively.

19. The method of claim 18 further comprising extending a cross-member between opposing ends of the I-beam and swaging bolts for attachment of the cross-member to the I-beam.

20. The method of claim 16 further comprising boring first and second apertures through the I-beam and swaging first and second guide tubes into the first and second apertures, respectively.

21. The method of claim 16 further comprising:
   forming first and second attachment holes at opposing ends of the I-beam;
   extending a cross-member between the opposing ends; and
   swaging bolts within the attachment holes for securing the cross-member to the I-beam.

* * * * *